Nov. 8, 1960 F. R. HOUSE 2,959,369
REELING SYSTEM FOR TAPE-STEPPING DEVICES
FOR HIGH-SPEED MAGNETIC RECORDING
Original Filed Sept. 23, 1954
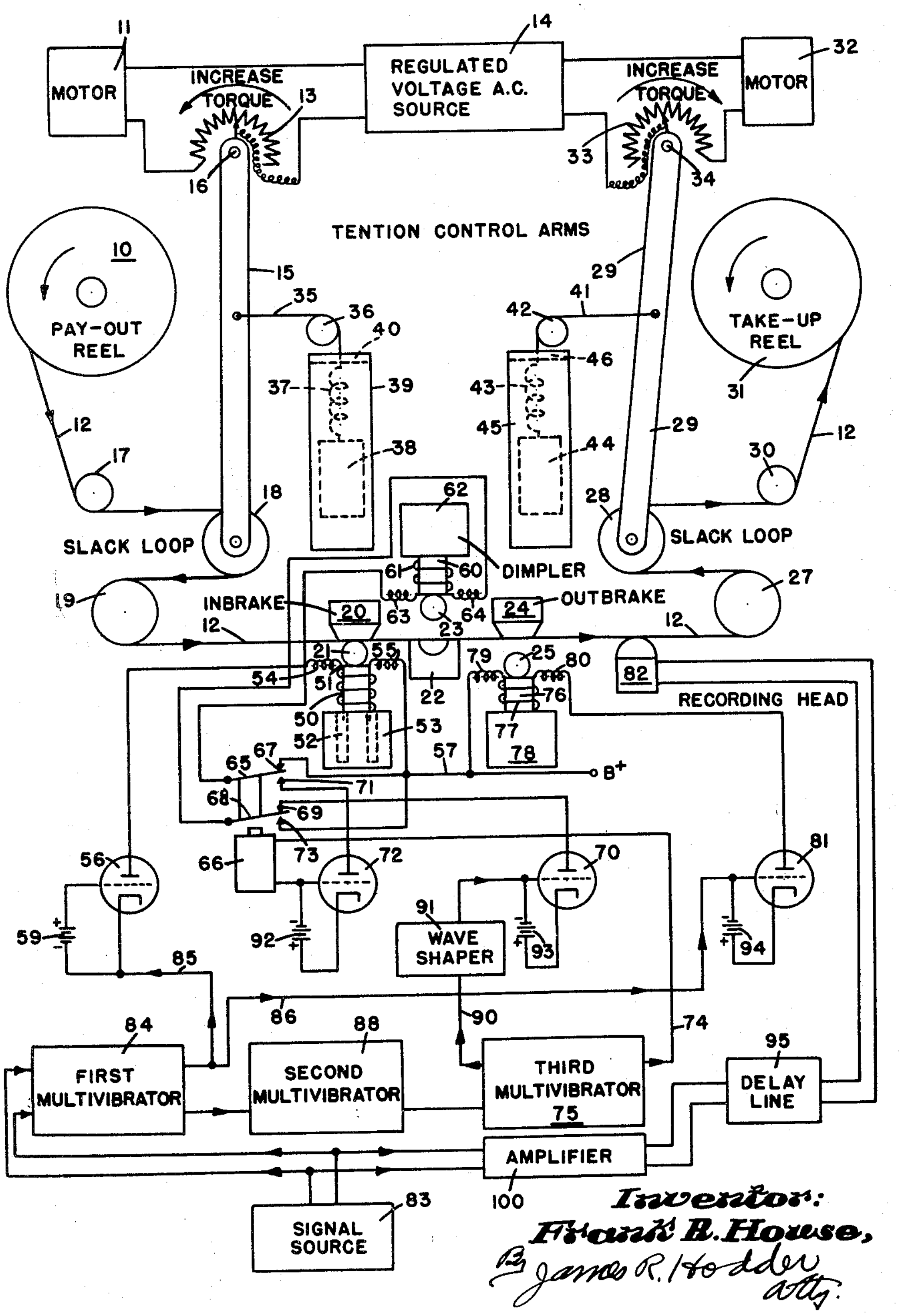
Inventor:
Frank R. House,
By James R. Hodder
Atty.

United States Patent Office 2,959,369

Patented Nov. 8, 1960

2,959,369

REELING SYSTEM FOR TAPE-STEPPING DEVICES FOR HIGH-SPEED MAGNETIC RECORDING

Frank R. House, Franklin, Mass., assignor, by mesne assignments, to Anelex Corporation, Concord, N.H., a corporation of New Hampshire Original application Sept. 23, 1954, Ser. No. 457,846, now Patent No. 2,814,676, dated Nov. 26, 1957. Divided and this application Sept. 5, 1957, Ser. No. 682,211

2 Claims. (Cl. 242—55.12)

This invention relates to recording systems using magnetic recording tape and the like, and relates more particularly to such systems in which the information to be recorded occurs at irregular intervals.

This application is a division of my application Serial No. 457,846, which issued as Patent No. 2,814,676 on November 26, 1957.

Ordinary magnetic tape-recording systems involve the passage of the tapes past the magnetic recording heads at speeds commensurate with the maximum frequency of the signals to be recorded. When such signals are received in a continuous train, the magnetic tape is used efficiently in that there is no appreciable length of tape upon which a signal is not recorded. There are, however, applications for magnetic tape-recording where the information to be recorded occurs at irregular or random intervals. Such signals cannot be anticipated as to time of occurrence since they may be emitted by data-handling or communication equipment, the output of which is subject to the will of a human operator, or to more or less random occurrence of the condition which actuates the transmitting equipment. If the usual tape-recording methods are used to record signals of this type, there may result long intervals of tape upon which no signal is recorded, with consequent waste of tape. Furthermore, when such a tape-recording is used in a play-back device, a great deal of time is lost in playing back due to the blank spaces on the tape.

This invention provides a tape-recording system in which each incoming signal to be recorded steps the feeder of the system once and is simultaneously recorded on the tape. Thus, incoming signals of random frequency are recorded in evenly spaced steps, and all of the tape is utilized.

Play-back of the recorded tape is economical of time because of the absence of blank tape sections which would be encountered in continuous feed recordings of random messages.

In one embodiment of this invention, which is capable of feeding tape in evenly spaced increments at sustained or intermittent rates at from 0 to more than 500 steps per second, the tape-feeding device includes three basic elements: an in-brake, a dimpler, and an out brake. These are operated under control of the signal to be recorded, to alternately flex and straighten the tape in such a manner that the tape is pulled from one end during flexure, and drawn from the other end during straightening.

A feature of this invention is that the recording tape is normally stationary; its movement is started by an incoming signal, following which it proceeds thru a cycle of operations including the recording on the tape, and then stops until the next signal arrives.

Another feature of this invention is that a tape supply and take-up mechanism is provided which keeps the tape taut at both ends of the feeder while maintaining a slight net tension on the tape in the feed direction.

Another feature of this invention is that the tape supply and take up mechanism automatically compensates for changes in feed rate so as to always maintain proper tape tension.

Another feature of this invention is that means is provided for decoupling the tape-feeding device from the inertias of the tape supply and take-up assemblies so that the response of the feeder proper to incoming signals is sufficiently fast.

An object of this invention is to conserve space on a tape on which random signals are recorded.

This invention will now be described with reference to the annexed drawing which is a diagrammatic view of one embodiment of the invention.

Referring now to Fig. 1 of the drawings, a tape payout reel 10 is connected to a conventional hysteresis type electric motor 11 which includes built-in speed-reducing gearing, and which is continuously operated in a stalled condition to exert a small clockwise torque on the reel 10, and, therefore, a slight reverse tension on the tape 12 from the reel. The motor 11 is connected in series with the rheostat 13 to the regulated A.C. voltage source 14. The slider of the rheostat is attached to the upper end of the control arm 15 which is rotatably supported at 16 from the rheostat assembly.

The tape 12 as it is payed out from the reel 10 passes over the idler roll 17, the roll 18 which is rotatably attached to the lower end of the arm 15, the roll 19, then between the anvil 20 and the cylindrical bar 21 of the in-brake, then between the anvil 22 and the cylindrical bar 23 of the dimpler, then between the anvil 24 and the cylindrical bar 25 of the out-brake, then over the recording head 82, then over the idler roll 27, the roll 28 which is rotatably attached to the lower end of the control arm 29, then over the idler roll 30, and finally is wound up on the take-up reel 31.

The take-up reel 31 is connected to a conventional hysteresis type electric motor 32 which has built-in speed-reducing gearing similar to the motor 11, and which is connected in series with the rheostat 33 to the A.C. source 14. The slider of the rheostat 33 is attached to the upper end of the control arm 29 which is rotatably supported at 34 to the assembly of the rheostat 33. The motor 32 rotates the reel 31 in a direction to wind the tape 12 thereon.

The control arm 15 has attached thereto between its upper and lower ends one end of the cable 35 which passes over the idler pulley 36, and which is connected at its other end to the upper end of the coiled spring 37, to the lower end of which the weight 38 is attached. The spring and weight are within a container 39 which is filled with a damping liquid 40 which may be water or any other suitable liquid for damping the movement of the weight 38.

The control arm 29 has attached thereto between its upper and lower ends one end of the cable 41, which passes over the idler pulley 42 and is connected at its other end to the upper end of the coiled spring 43, to the lower end of which the weight 44 is attached. The spring 43 and the weight 44 are within the container 45 which is filled with a damping liquid 46 similar to the liquid 40 within the container 39.

The bar 21 of the in-brake is attached to the top of the cylindrical tube 50 which has the winding 51 thereon. The tube 50 extends within an annular air gap 52 of the permanent magnet 53, this construction being similar to that of a conventional dynamic loud speaker, the tube 50 and its winding 51 corresponding to the voice coil of such a speaker, and may have a restoring means, which is not shown, for returning the in-brake to its mid-position although this is not essential. The ends of the winding 51 have the flexible leads 54 and 55 connected thereto.

The lead 54 is connected to the plate of the triode 56. The lead 55 is connected to the bus 57 which is connected to B+, the positive terminal of a conventional plate voltage supply source which is not illustrated. An electro-magnetic unit having a field winding can be used instead of the permanent magnet one.

The control grid of the triode 56 is connected to the positive terminal of the bias battery 59, the negative terminal of which is connected to the cathode of the triode. The grid of the triode is normally biased positively so that the triode normally conducts and supplies plate current thru the winding 51 on the coil 50 of the in-brake, causing the bar 21 to press the tape 12 against the anvil 20 so that the tape is held against movement.

The dimpler bar 23 is attached to the lower end of the cylindrical tube 60 which has a winding 61 thereon, the tube 60 being movable within an annular air gap of the permanent magnet 62 similar to that of the in-brake, this construction also being similar to that of a dynamic loud speaker. For reversing the direction of current flowing thru the winding 61, a reversal device shown symbolically as a relay 66 is provided. The ends of the winding 61 are connected to the flexible leads 63 and 64. The lead 63 is connected to the armature 65 of the relay 66, which armature is in contact with the relay contact 67 when the relay is de-energized. The contact 67 is connected to B+.

The lead 64 is connected to the relay armature 68 which is in contact with the relay contact 69 when the relay is de-energized. The contact 69 is connected to the plate of the triode 70. When the relay is energized, its armature 65 touches the relay contact 71 which is connected to the plate of the triode 72, and its armature 68 touches the relay contact 73 which is connected to B+. The energizing winding of the relay 66 is connected in series with the output lead 74 of the multivibrator 75 and the control grid of the triode 72.

The relay 66 and its armatures and contacts act as a double-pole, double-throw switch, connecting one end of the winding 61 of the dimpler to the plate of the tube 72, and the other end of the winding 61 to B+ when the relay is de-energized, and connecting the other end of the winding 61 to the plate of the tube 70, and the one end of the winding 61 to B+ when the relay is energized. The polarity of the current flowing thru the winding 61 is thus reversed when the relay is energized. Relays capable of high speed operation are manufactured by Stevens-Arnold Inc. of Boston, Mass., and may be used.

The bar 25 of the out-brake is attached to the upper end of the cylindrical tube 76 which has a winding 77 thereon, and which is movable in an annular air gap within the magnet 78, this construction being similar to that of a dynamic loud speaker as in the cases of the in-brake and dimpler. The flexible leads 79 and 80 are connected to the ends of the winding 77. The lead 79 is connected to B+, and the lead 80 is connected to the plate of the triode 81.

The recording head 82 is connected thru the delay line 95 and the amplifier 100 to the signal source 83, which is also connected to the input of the first multivibrator 84. One output of the multivibrator 84 is connected thru output lead 85 to the cathode of the triode 56, and thru the output lead 86 to the control grid of the triode 81. The other output of the multivibrator 84 is connected to the input of the second multivibrator 88. The output of the second multivibrator 88 is connected to the input of the third multivibrator 75.

During the feeding of the tape, the correct amount of tension on the tape results from the torque delivered by the two motors 11 and 32 and the slack loop mechanisms. In effect, these motors act like magnetically-coupled, slipping clutches in which the slip is closely controlled. The correct amount of this tension is maintained constant thru the action of the tension control arms 15 and 29. Any change in the tape tension due to feed rate variations and tape-stepping accelerations is fed back into the torque motors in such a manner as to oppose the change. If, for instance, the feed rate is suddenly increased, the increased average tension at the input side of the tape is communicated by the action of the weight 38 thru the control arm 15 to the slider of the rheostat 13, which slider is rotated clockwise, increasing the resistance in the supply circuit of the motor 11, and decreasing the torque on the pay-out reel 10. At the same time, the increase in tape speed tends to reduce tape tension in the output side of the feeder. This results in movement of the control arm 29 by the weight 44, causing clockwise rotation of the slider of the rheostat 33, reducing the resistance in the supply circuit of the motor 32, and increasing the torque which it applies to the reel 31. When the feed rate is reduced, the reverse action will take place.

An important feature of the tape-tensioning device is the inertia de-coupling of the tape in the feeder from the relatively large masses of the rest of the feed and take-up mechanism. This function of the mechanism enables the feeder to step the tape accurately at high speeds since only small masses need be accelerated. The control arms 15 and 29 are light in weight and pivot easily so that any tension increase moves the proper control arm so as to momentarily supply an extra portion of tape from the slack loop to the feeder. Simultaneously, all input torques to the pay-out and take-up reels are corrected by the actions of the weights 38 and 44 and the motor controls.

The weights 38 and 44 are isolated from very rapid motions of the control arms by the very soft springs 37 and 43, respectively, which absorb such motions and act as decouplers. Any tendency of the weights to oscillate is damped out by the damping liquids in the containers 37 and 45 in which the weights are suspended.

While the invention has been described in connection with tape-recording, it could be used for wire-recording. In the annexed claims, the word "tape" is intended to be a generic term which includes wire or equivalents.

While one embodiment of this invention has been described for the purpose of illustration, it should be understood that the invention is not limited to the exact apparatus and arrangement of apparatus illustrated and described, since modifications thereof may be suggested by those skilled in the art, without departure from the essence of the invention.

What is claimed, is:

1. A tape recording system including a tape upon which signals are to be recorded, comprising a pay-out reel attached at one end to said tape, a take-up reel attached to the other end of said tape and spaced from said pay-out reel, means including a first motor for applying torque to said pay-out reel in a direction opposing pay-out of tape therefrom, means including a second motor for applying torque to said take-up reel in a direction to take up tape thereon, a recorder between said reels for recording signals on said tape, first tension-responsive means responsive to the tension in the tape between said pay-out reel and said recorder for decreasing the torque applied by said first motor to said pay-out reel upon an increase in the tension of the tape, and second tension-responsive means responsive to the tension in the tape between said take-up reel and said recorder for increasing the torque applied by said second motor to said take-up reel upon a decrease in the tension of the tape, the first and second tension-responsive means each including means forming a slack loop in the tape and including in said loop an idler roll around a portion of which the tape is threaded and which is movable towards and from said recorder, an upwardly extending control arm pivoted at its upper end and rotatably supporting said idler roll at its lower end, a cable attached to said arm between its said ends, a second idler roll supported for rotation opposite where said cable is attached to said arm, said cable passing over said second idler roll, a substantially vertically extending coiled spring attached at its upper end to said cable at the side of said second idler roll which is opposite the side of said second idler roll which faces said arm, a weight attached to the lower end of said spring, and impedance means in the circuit of its respective motor which is varied by movement of said arm.

2. A tape recording system as claimed in claim 1 in which each weight is immersed in a damping liquid.

References Cited in the file of this patent

UNITED STATES PATENTS

| | | |
|---|---|---|
| 1,865,410 | Byles | June 28, 1932 |
| 2,071,192 | Younts | Feb. 16, 1937 |
| 2,365,691 | Fodor | Dec. 26, 1944 |
| 2,656,129 | De Turk et al. | Oct. 20, 1953 |
| 2,745,604 | Masterson | May 15, 1956 |

FOREIGN PATENTS

| | | |
|---|---|---|
| 425,399 | France | Apr. 3, 1911 |